US008537880B2

(12) United States Patent
Agarwal et al.

(10) Patent No.: US 8,537,880 B2
(45) Date of Patent: Sep. 17, 2013

(54) APPARATUS AND METHOD FOR FRAME SYNCHRONIZATION IN SATELLITE COMMUNICATION SYSTEM

(75) Inventors: Vikas Agarwal, Daejeon-si (KR); Pan-Soo Kim, Daejeon-si (KR); Deock-Gil Oh, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/324,351

(22) Filed: Dec. 13, 2011

(65) Prior Publication Data

US 2012/0163423 A1 Jun. 28, 2012

(30) Foreign Application Priority Data

Dec. 23, 2010 (KR) ........................ 10-2010-0133788

(51) Int. Cl.
*H04W 56/00* (2009.01)

(52) U.S. Cl.
USPC ............................ 375/211; 375/354; 375/343

(58) Field of Classification Search
USPC .......................................... 375/343, 211, 354
See application file for complete search history.

(56) References Cited

U.S. PATENT DOCUMENTS 5,867,490 A * 2/1999 Campanella .................. 370/326
6,654,432 B1 * 11/2003 O'Shea et al. ................ 375/354
2010/0007743 A1 1/2010 Kim et al.

OTHER PUBLICATIONS

Pansoo Kim, et al. "Robust frame synchronization for the DVB-S2 system with large frequency offsets", International Journal of Satellite Communications, Nov. 2008, pp. 35-52.

* cited by examiner

*Primary Examiner* — Kenneth Lam
*Assistant Examiner* — Michael Neff
(74) *Attorney, Agent, or Firm* — Staas & Halsey LLP

(57) ABSTRACT

Provided is a frame synchronization apparatus capable of reducing the amount of total computation and computation delays when a receiver of a satellite communication system calculates correlation between an input signal for frame synchronization and a signal sequence of the receiver, since the receiver uses no multiplier. The frame synchronization apparatus includes a correlator to obtain a correlation value of a unique word of a receiver with respect to a symbol data stream of a frame received from a transmitter of the satellite communication system, a comparator to compare the correlation value to a predetermined threshold value, and a determiner to determine whether the frame has been synchronized, based on the result of the comparison by the comparator.

6 Claims, 5 Drawing Sheets

APPARATUS AND METHOD FOR FRAME SYNCHRONIZATION IN SATELLITE COMMUNICATION SYSTEM

CROSS-REFERENCE TO RELATED APPLICATION

This application claims the benefit under 35 U.S.C. §119 (a) of a Korean Patent Application No. 10-2010-0133788, filed on Dec. 23, 2010, the entire disclosure of which is incorporated herein by reference for all purposes.

BACKGROUND

1. Field

The following description relates to an apparatus and method for frame synchronization in a satellite communication system, and more particularly, to an apparatus and method in which a receiver synchronizes frames of signals transmitted through satellites.

2. Description of the Related Art

Satellite communication systems, specifically, DVB-S2 (Digital Video Broadcasting via Satellite, Second Generation) has achieved extension of satellite channel capacity up to 100 to 200% by using Adaptive Coding and Modulation (ACM) of selecting an optimal modulation scheme and an optimal coding rate adaptively to the state of a satellite communication channel. Introduction of a channel coding technique such as Low Density Parity Check (LDPC) has implemented a transmission system that satisfies a low bit error rate even under a unstable environment such as at a low Signal-to-Noise Rate (SNR). According to a burst-based satellite communication mode, a transmitter of a satellite communication system transmits each frame after appending a short preamble at a start point from which a burst is transmitted. Also, a receiver of the satellite communication system performs frame synchronization, symbol timing synchronization, frequency/phase synchronization, demodulation/decoding, etc., in unit of a burst, using the preamble of a received frame. In the burst-based communication mode, there may be frames in which only noise exists without any signal, and frames may be received from different users for each burst. Accordingly, the power of a received signal may vary depending on frames.

For this reason, in order to restore a received satellite signal to demodulate it, frame synchronization has to be able to be performed regardless of the signal level of a burst signal. A general method for frame synchronization obtains a correlation value between a received input signal and a known signal sequence, and determines if the correlation value exceeds a threshold value to detect a frame start point. For implementing the frame synchronization method, operation of multiplying an input signal by a known signal sequence is needed, which requires many multipliers, resulting in an increase of the overhead.

SUMMARY

The following description relates to a technique for reducing the amount of total computation and computation delays when a receiver of a satellite communication system calculates correlation between an input signal for frame synchronization and a signal sequence of the receiver, since the receiver uses no multiplier.

In one general aspect, there is provided a frame synchronization apparatus in a satellite communication system, including: a correlator to obtain a correlation value of a unique word of a receiver with respect to a symbol data stream of a frame received from a transmitter of the satellite communication system; a comparator to compare the correlation value to a predetermined threshold value; and a determiner to determine whether the frame has been synchronized, based on the result of the comparison by the comparator.

The correlator includes: a data partition unit to partition the received symbol data stream by a predetermined data size; a data processor to process the unique word in n power of 2; and a multiplication processor to multiply a symbol data stream partitioned by the predetermined data size by the unique word processed in n power of 2.

In one general aspect, there is provided a frame synchronization method including: obtaining a correlation value of a unique word of a receiver with respect to a symbol data stream of a frame received from a transmitter of the satellite communication system; comparing the correlation value to a predetermined threshold value; and determining whether the frame has been synchronized, based on the result of the comparison by the comparator.

According to the frame synchronization apparatus and method, it is possible to reduce computation delays when a receiver of a satellite communication system calculates correlation between an input signal for frame synchronization and a signal sequence of the receiver, since the receiver uses no multiplier.

Other features and aspects will be apparent from the following detailed description, the drawings, and the claims.

Figure 1:
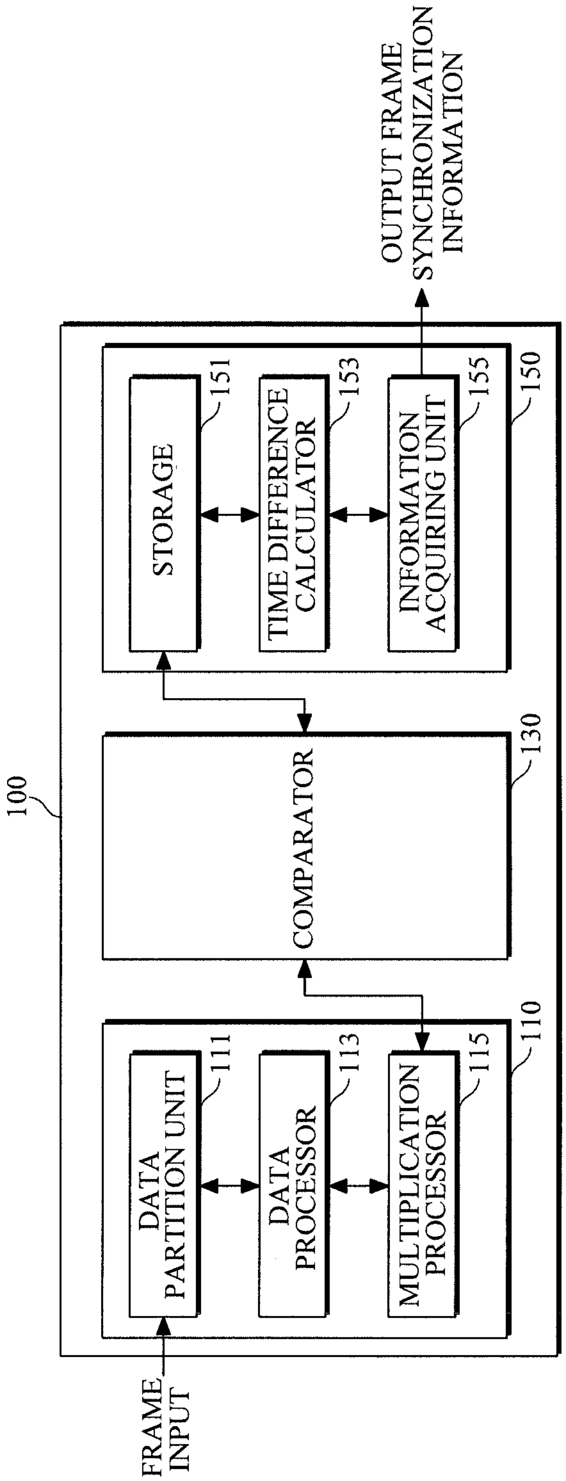
FIG. 1 is a diagram illustrating an example of a frame synchronization apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a frame synchronization apparatus.

Referring to FIG. 1, the frame, synchronization apparatus 100 includes a correlator 110, a comparator 130, and a determiner 150. The correlator 110 calculates a correlation value of a unique word of a receiver with respect to a symbol data steam of a frame transmitted from a transmitter of a satellite communication system. Here, the unique word includes a Start of Frame (SOF) and a Physical Layer Signaling Code (PLSC). The SOF is composed of 26 symbols, and the PLSC is composed of 32 symbols. The symbol data stream of the received frame includes SOF symbols, PLSC symbols, and data symbols. The received symbols are π/2 BPSK modulated at the transmitter. Meanwhile, the correlation value is expressed as equation 1, below.

$$z_k(n)=x(n)*h_k(n), \quad (1)$$

where $Z_k(n)$ represents the correlation value, x(n) represents an input value of the received signal and $h_k(n)$ represents the unique word of the receiver, wherein $k\in\{0, \ldots, M-1\}$ and M represents the length of the unique word. The frame synchronization apparatus multiplies an input signal by unique words that are set in advance by a receiver. Each unique word may be expressed in the form of a binary code as written in equation 2, below.

$$h(k) = \sum_{i=0}^{N-1} a_{i,k} * 2^i, \quad (2)$$

where h(k) represents the unique word of the receiver, and N represents the length of the binary code of the unique word, wherein $a_{i,k}\in\{0, 1\}$. In order to calculate the correlation value, all the unique words have to be multiplied by the input signal.

Meanwhile, the correlator 110 includes a data partition unit 111, a data processor 113, and a multiplication processor 115. The data partition unit 111 partitions the received symbol data stream by a predetermined data size, wherein the predetermined data size is 4 bits. If 1 bit of a binary number is input as input data, an AND gate for multiplication is used to calculate a correlation value. However, since a decimal number is input as input data, multiplication of 16 bits×16 bits is needed to convert the decimal number to a binary number. In this case, using an XOR gate for individual computations increases computational complexity, and accordingly, computation is conducted in unit of 4 bits. Accordingly, a multiplication delay time may be reduced.

The data processor 113 processes the unique word in n power of 2. If all the unique words are grouped in unit of m bits, equation 2 is rewritten to equation 3, below.

$$h(k) = 2^{N-4(1+m)} \sum_{i=0}^{3} a_{i,k} * 2^i, \quad (3)$$

where $m\in\text{ceil}\{N/4\}$, and N represents the length of a binary bit expression of the unique word.

Accordingly, equation 1 is rewritten by equation 3, as follows.

$$z_k(n) = \sum_{m=0}^{ceil(N/4)} 2^{N-4(1+m)} * x(n) * \sum_{i=0}^{3} a_{i,k} * 2^i, \quad (4)$$

In equation 4, a ceil function outputs a value resulting from rounding up the decimal points of a value given as a parameter. For example, if the length of a unique word is 15 bits, the 15 bits are partitioned in unit of 4 bits to become 3.75, however, the ceil function outputs a value of 4. Equation 4 may be divided into two parts: one is $$h(k) = \sum_{i=0}^{N-1} a_{i,k} * 2^i$$

and the other is $$\sum_{m=0}^{ceil(N/4)} 2^{N-4(1+m)}.$$

The part $$h(k) = \sum_{i=0}^{N-1} a_{i,k} * 2^i$$

represents the operation of processing an arbitrary input in unit of a predetermined number of bits, and the part $$\sum_{m=0}^{ceil(N/4)} 2^{N-4(1+m)}$$

represents binary shifting.

The multiplication processor 115 multiplies the symbol data stream partitioned by the predetermined data size by the data partition unit 111, by the unique word calculated in n power of 2 by the data processor 113. Multiplication of a unique word with an input signal in the form of a complex number may be conduced by a shifter and an adder, without having to use a multiplier. Details for the multiplication processor 115 will be described with reference to FIG. 2, below.

Figure 2:
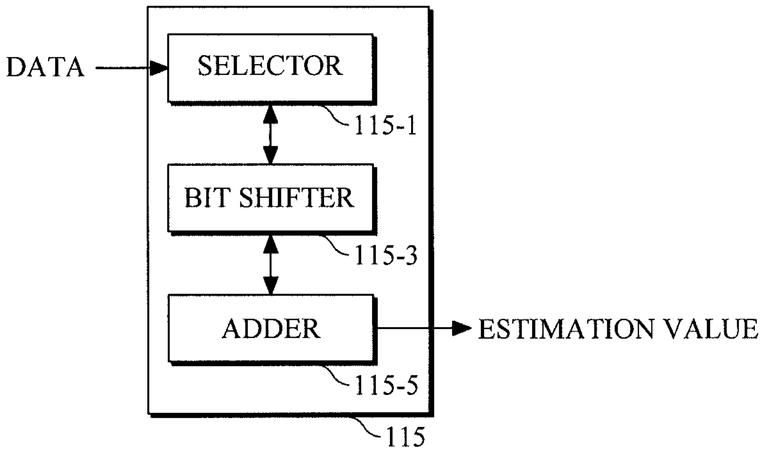
FIG. 2 is a diagram illustrating an example of a multiplication processor in the frame synchronization apparatus illustrated in FIG. 1.

FIG. 2 is a diagram illustrating an example of the multiplication processor 115.

Referring to FIG. 2, the multiplication processor 115 includes a selector 115-1, a bit shifter 115-3, and an adder 115-5. The selector 115-1 selects one from among unique words computed in n power of 2.

The bit shifter 115-3 bit-shifts the selected unique word by a predetermined number of bits. The adder 115-5 adds the bit-shifted unique word to another bit-shifted unique word. If the unique word is a SOF, total 52 multiplication processors are used, if the unique word is a PLSC, total 12 multiplication processors are used, and if the unique word includes both a SOF and a PLSC, total 64 multiplication processors are used, wherein each multiplication processor includes three selectors 115-1 and two adders 115-5. Accordingly, by performing multiplication using only bits shifters and adders without using any multipliers, computation delays may be reduced. Bit shifting of the multiplication processor 115 will be described with reference to FIGS. 3A through 3B, below.

Figure 3A:
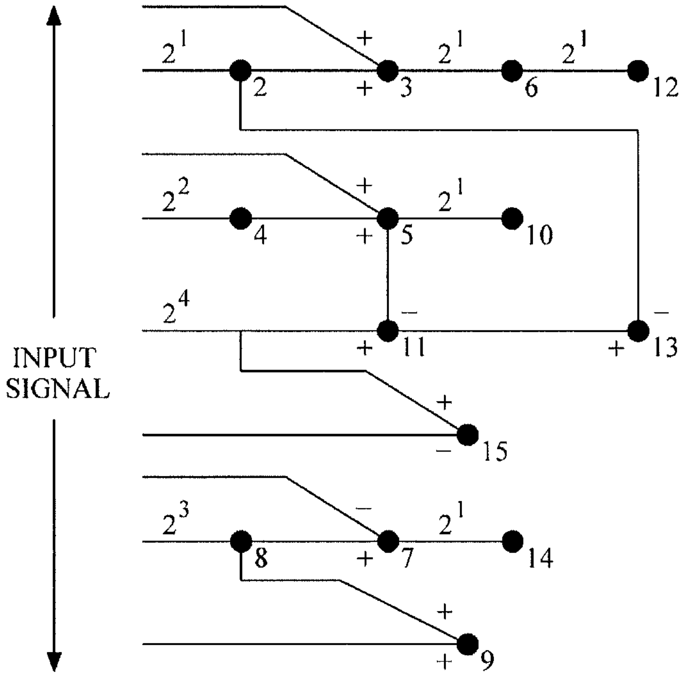
FIG. 3A is a view for explaining an example of multiplications.

FIG. 3A is a view for explaining an example of multiplications.

In FIG. 3A, each node represents an adder, and also represents a unique word of the frame synchronization apparatus illustrated in FIG. 1. Also, a base represents a shift in n power of 2. FIG. 3A corresponds to a process for multiplication of an input signal with a unique word (0-15) of a receiver. For example, in the case of node 2, $Z_k(n)=x(n)*2$. In this case, an estimation value $Z_k(n)$ may be obtained by shifting an input value x(n) by $2^1$. Also, in the case of node 7, $Z_k(n)=x(n)*2^3-$ x(n). In this case, an estimation value $Z_k(n)$ may be obtained by shifting an input value x(n) by $2^3$ and subtracting 1 from the shifted result.

Figure 3B:
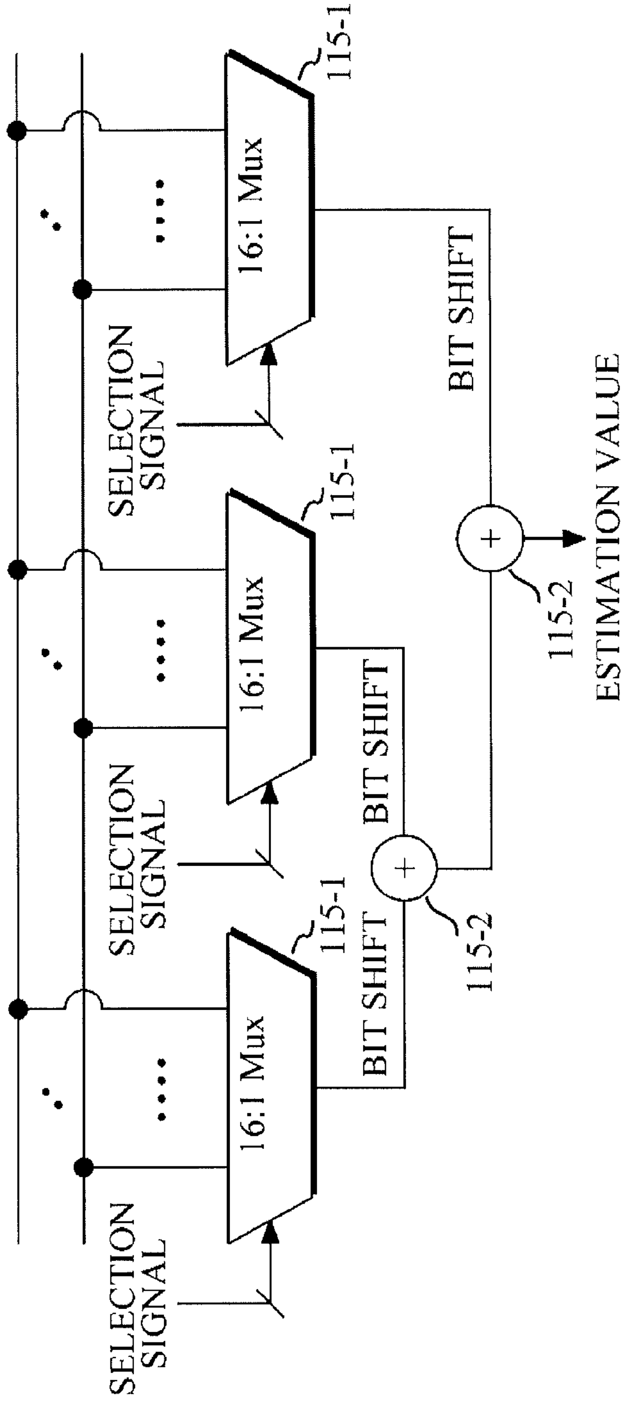
FIG. 3B is a view for explaining use of multiplexers and adders for the multiplications.

FIG. 3B is a view for explaining use of multiplexers and adders for the multiplications.

Referring to FIG. 3B, a multiplication processor includes three selectors 115-1 and two adders 115-2. Each selector 115-1 may be a 16:1 multiplexer that uses a unique word as a selection signal with respect to an input signal. A value selected by each multiplexer is shifted and then input to an adder. The shifted value is added with a value selected and shifted by another multiplexer, thereby creating a final estimation value.

As described above, the number of required multiplication processors depends on the lengths of SOF and PLSC symbols of an input signal. Each multiplication processor includes two adders.

TABLE 1

| Scheme for Frame | Number of Multipliers | | Number of Adders | |
|---|---|---|---|---|
| Synchronization | Conventional | Proposed | Conventional | Proposed |
| Scheme Based on SOF Symbols | 104 | 0 | 52 | 104 |
| Scheme Based on PLSC Symbols | 24 | 0 | 12 | 24 |
| Scheme based on SOF and PLSC symbols | 128 | 0 | 64 | 128 |

Table 1 shows the numbers of required multipliers and adders in the respective cases of using SOF symbols, of using PLSC symbols, and of using SOF and PLSC symbols for frame synchronization. It is seen from Table 1 that the conventional methods have required multipliers in all the cases, however, the proposed methods have required no multiplier although requiring adders more twice than that required in the conventional methods. However, in consideration of the amount of total computation and computation delays, using no multipliers will contribute to a significant reduction of computation delays.

Referring again to FIG. 1, the comparator 130 compares the correlation value calculated by the correlator 110 to a predetermined threshold value. Here, the predetermined threshold value is a value that can be arbitrarily set by the receiver. The determiner 150 determines whether or not the corresponding frame has been synchronized, based on the result of the comparison by the comparator 130. The determiner 150 includes a storage 151, a time difference calculator 153, and an information acquiring unit 155. The storage 151 stores, when the comparator 130 determines that the correlation value is greater than the predetermined threshold value, temporal information of a correlation point corresponding to the correlation value. The time difference calculator 153, which is connected to the storage 151, uses temporal information stored in the storage 151 to calculate a time difference between two correlation points in a predetermined time period, at which the corresponding correlation values exceed the predetermined threshold value. The information acquiring unit 155, which is connected to the time difference calculator 153, receives the time difference between two correlation points from the time difference calculator 153, recognizes a structure of the corresponding transmission frame based on the time difference between two correlation points, acquires information about the transmission frame, such as a modulation method, a frame type, and the presence or absence of pilots, and outputs the information.

Figure 4:
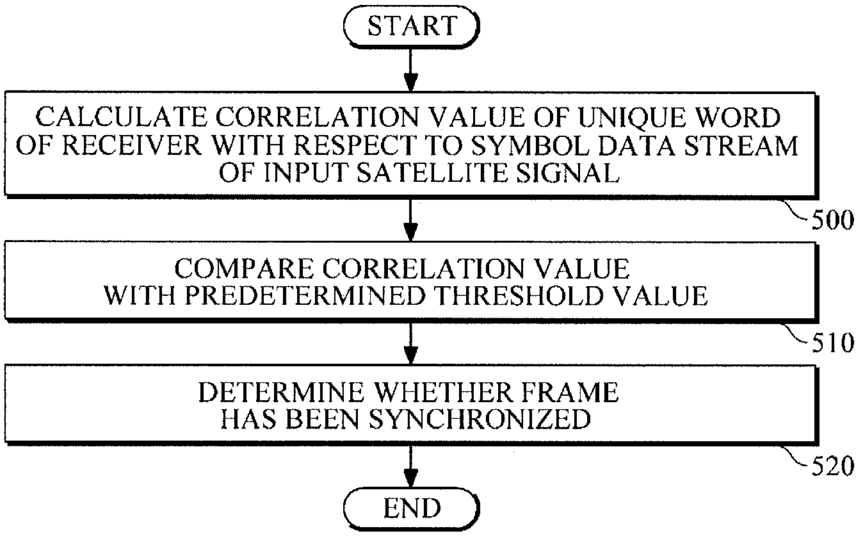
FIG. 4 is a flowchart illustrating an example of a frame synchronization method.

FIG. 4 is a flowchart illustrating an example of a frame synchronization method.

Referring to FIG. 4, a correlation value of a unique word of a receiver with respect to a symbol data stream of a frame received from a transmitter of a satellite communication system is calculated (500). Here, the unique word of the receiver is a SOF and/or a PLSC. The operation 500 of calculating the correlation value is to partition the received symbol data stream by a predetermined data size, to process the unique word in n power of 2, and then to multiply the partitioned symbol data stream by the unique word processed in n power of 2.

Meanwhile, the operation of multiplying the partitioned symbol data stream with the unique word is to select one from among unique words processed in n power of 2, to bit-shift the selected unique word by a predetermined number of bits, and then to add the bit-shifted unique word with another bit-shifted unique word. Details for the operation have been described above in correlation with the multiplication processor 115 in FIG. 1.

Then, the correlation value is compared with a predetermined threshold value to determine whether there is any correlation value exceeding the predetermined threshold value (510). Then, it is determined whether the corresponding frame has been synchronized based on the result of the comparison between the correlation value and the predetermined threshold value (520). If there is a correlation value exceeding the predetermined threshold value, temporal information of a correlation point corresponding to the correlation value is stored, and a time difference between two correlation points in a predetermined time period, at which the corresponding correlation values exceed the predetermined threshold value, is calculated. Then, a structure of the corresponding transmission frame is recognized using the time difference between the correlation points, and information about the transmission frame, such as a modulation method, a frame type, and the presence or absence of pilots, is acquired.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A frame synchronization apparatus in a satellite communication system, comprising:

a correlator to obtain a correlation value of a unique word of a receiver with respect to a symbol data stream of a frame received from a transmitter of the satellite communication system;

a comparator to compare the correlation value to a predetermined threshold value; and a determiner to determine whether the frame has been synchronized, based on a result of the comparison by the comparator, wherein the determiner comprises an information acquiring unit to recognize a structure of the frame using a time difference between two correlation points, thus acquiring information about the frame, including a modulation method, a frame type, and presence or absence of pilots.

2. A frame synchronization apparatus in a satellite communication system, comprising:

a correlator to obtain a correlation value of a unique word of a receiver with respect to a symbol data stream of a frame received from a transmitter of the satellite communication system;

a comparator to compare the correlation value to a predetermined threshold value; and a determiner to determine whether the frame has been synchronized, based on a result of the comparison by the comparator, wherein the correlator comprises:

a data partition unit to partition the received symbol data stream by a predetermined data size;

a data processor to process the unique word in n power of 2, n being the length of the binary code of the unique word; and a multiplication processor to multiply a symbol data stream partitioned by the predetermined data size by the unique word processed in n power of 2.

3. The frame synchronization apparatus of claim 2, wherein the multiplication processor comprises:

a selector to select a unique word from among unique words processed in n power of 2;

a bit shifter to bit-shift the selected unique word by a predetermined number of bits; and an adder to add the bit-shifted unique word to another bit-shifted unique word.

4. The frame synchronization apparatus of claim 3, wherein the multiplication processor includes three selectors and two adders.

5. The frame synchronization apparatus of claim 2, wherein total 52 multiplication processors are used if the unique word is a Start Of Frame (SOF), total 12 multiplication processors are used if the unique word is a Physical Layer Signaling Code (PLSC), and if the unique word is a SOF and a PLSC, total 64 multiplication processors are used.

6. A frame synchronization apparatus in a satellite communication system, comprising:

a correlator to obtain a correlation value of a unique word of a receiver with respect to a symbol data stream of a frame received from a transmitter of the satellite communication system;

a comparator to compare the correlation value to a predetermined threshold value; and a determiner to determine whether the frame has been synchronized, based on a result of the comparison by the comparator, wherein the determiner comprises:

a storage to store temporal information of a correlation point corresponding to a correlation value that exceeds the predetermined threshold value;

a time difference calculator to calculate a time difference between two correlation points in a predetermined time period, at which corresponding correlation values exceed the predetermined threshold value, based on the temporal information stored in the storage; and an information acquiring unit to recognize a structure of the frame using the time difference between the correlation points, thus acquiring information about the frame, including a modulation method, a frame type, and presence or absence of pilots.

* * * * *